(12) United States Patent
Shu et al.

(10) Patent No.: US 9,251,572 B2
(45) Date of Patent: Feb. 2, 2016

(54) SYSTEM AND METHOD OF CORRECTING IMAGE ARTIFACTS

(71) Applicant: QUALCOMM Incorporated, San Diego, CA (US)

(72) Inventors: Xianbiao Shu, San Diego, CA (US); Xiaoyun Jiang, San Diego, CA (US); Weihua Xiong, Cupertino, CA (US); Weiliang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/191,190

(22) Filed: Feb. 26, 2014

(65) Prior Publication Data

US 2015/0030247 A1    Jan. 29, 2015

Related U.S. Application Data

(60) Provisional application No. 61/858,956, filed on Jul. 26, 2013.

(51) Int. Cl.
*G06K 9/00* (2006.01)
*G06T 5/00* (2006.01)
*H04N 1/58* (2006.01)

(52) U.S. Cl.
CPC ...... *G06T 5/005* (2013.01); *H04N 1/58* (2013.01); *G06T 2207/10024* (2013.01)

(58) Field of Classification Search
CPC ...... G06K 9/40; G06T 3/4007; G06T 3/4015; G06T 5/002; G06T 5/005; G06T 5/20; G06T 5/50; G06T 2207/10024; G06T 2207/20016; G06T 2207/20028; G06T 2207/20032; G06T 2207/20192; H04N 1/3935; H04N 1/4092; H04N 1/58; H04N 1/6027; H04N 1/6077; H04N 1/646; H04N 9/045; H04N 9/646; H04N 9/77; H04N 2209/045; H04N 2209/046
See application file for complete search history.

(56) References Cited

U.S. PATENT DOCUMENTS

| | | | |
|---|---|---|---|
| 6,542,187 B1 | 4/2003 | Hamilton, Jr. et al. | |
| 7,565,007 B2 | 7/2009 | Ishiga | |
| 7,791,648 B2 | 9/2010 | Guarnera et al. | |
| 8,254,718 B2 | 8/2012 | Bennett et al. | |
| 8,509,533 B2 | 8/2013 | Ishiga et al. | |
| 8,520,969 B2 | 8/2013 | Tomaselli et al. | |
| 2006/0152596 A1 | 7/2006 | Adams et al. | |
| 2014/0119650 A1* | 5/2014 | Zhou | H04N 1/6077 382/167 |

OTHER PUBLICATIONS

International Search Report and Written Opinion—PCT/US2014/047465—ISA/EPO—Nov. 12, 2014.
Dong Y., et al., "A New Directional Weighted Median Filter for Removal of Random-Valued Impulse Noise", IEEE Signal Processing Letters, IEEE Service Center, Piscataway, NJ, US, vol. 14, No. 3, Mar. 2007, pp. 193-196, XP011165522.
Tomaselli V., et al., "False colors removal on the YCr-Cb color space", Proceedings of SPIE, vol. 7250, Jan. 18, 2009, pp. 72500c-1-72500c-10, XP055148304, ISSN: 0277-786X, DOI: 10.1117/12.805806.

* cited by examiner

*Primary Examiner* — Jose Couso
(74) *Attorney, Agent, or Firm* — Knobbe, Martens, Olson & Bear LLP

(57) ABSTRACT

Certain aspects relate to systems and techniques for correction of color artifacts including both color aberration and color spot artifacts using a unified framework. For example, both color aberration and color spot artifacts can be corrected using a post-processing method implementing directional median filtering on chroma channels. A pixel-by-pixel correction ratio map can be built by analyzing the luma and chroma components of the image to indicate a type of color artifact associated with each pixel in the image, and a directional median filter can be selected for each pixel based on the corresponding correction ratio map value.

30 Claims, 9 Drawing Sheets

| 0 | 0 | 0 | 0 | 0 |
|---|---|---|---|---|
| 0 | -1/8 | -1/8 | -1/8 | 0 |
| 0 | -1/8 | 1 | -1/8 | 0 |
| 0 | -1/8 | -1/8 | -1/8 | 0 |
| 0 | 0 | 0 | 0 | 0 |

405

| -1/16 | -1/16 | -1/16 | -1/16 | -1/16 |
|---|---|---|---|---|
| -1/16 | 1/8 | 1/8 | 1/8 | -1/16 |
| -1/16 | 1/8 | | 1/8 | -1/16 |
| -1/16 | 1/8 | 1/8 | 1/8 | -1/16 |
| -1/16 | -1/16 | -1/16 | -1/16 | -1/16 |

SYSTEM AND METHOD OF CORRECTING IMAGE ARTIFACTS

CROSS-REFERENCE TO RELATED APPLICATIONS

The present application claims the benefit under 35 U.S.C. §119(e) of U.S. Provisional Patent Application No. 61/858,956, filed on Jul. 26, 2013, entitled "SYSTEM AND METHOD OF CORRECTING IMAGE ARTIFACTS," the contents of which is hereby incorporated by reference herein in its entirety and for all purposes.

TECHNICAL FIELD

The systems and methods disclosed herein relate generally to image capture devices, and more particularly, to correcting color artifacts in captured images.

BACKGROUND

Images captured using digital cameras can suffer from color artifacts such as colorful spots and lines, particularly in highlight areas and sharp brightness edges. Such color artifacts are especially problematic on small mobile cameras with small and imperfect lenses. Color artifacts are often responsible for undesirable colorful spots and lines that should not be present in a captured image, for example bright dots/lines (specular areas) and sharp brightness edges (switching area between sky and obscure objects). Color artifacts can manifest themselves as "fringes" of high-contrast edges, resulting, for example, from the failure of the camera lens to focus all colors at one point on an image sensor.

Color spot artifacts, which are one type of color artifact, are undesirable colorful spots or lines, typically occurring around bright spots and high-contrast edges in an image. Color spot artifacts can be caused by several factors. In imaging systems using under-Nyquist sampling, color artifacts such as small bright dots/thin lines can be caused by sampling at the under-Nyquist rate. Color spot artifacts can also be caused by specular reflection of light, false correction of bits per channel, non-uniform color response of sensors, and imperfect demosaicking algorithms.

Another type of color artifacts, known as chroma or color aberrations, manifest as fringes of color along boundaries that separate dark and bright parts of an image. Color aberrations can occur when an imperfect lens fails to focus different colors of light at the same convergence point. This is because lenses have a different refractive index for different wavelengths of light (known as the dispersion of the lens), and because the refractive index decreases with increasing wavelength. Since the focal length of a lens is dependent on the refractive index, different wavelengths of light can be focused on different positions of the image sensor. Color aberration can also be caused by different wavelengths of light being focused at different positions in the focal plane. As a result, noticeable colored edges can appear around objects in the image, particularly in high-contrast areas.

SUMMARY

Color artifacts in a captured image may deteriorate the quality of the image, and can be particularly problematic on relatively small cameras such as are used in mobile devices. However, existing methods for correcting color artifacts do not present a unified approach to correcting the two types of color artifacts—color aberration and color spot artifacts. Conventionally, color aberration and color spot artifacts are addressed differently, with color aberration addressed by lens calibration methods and dynamic detection-correction methods, and with color spot artifacts corrected by imposing color consistence using demosaicking algorithms improved for robustness to highlight/saturated areas or by standalone, post-processing chroma filters. Accordingly, the color correction techniques described herein present example implementations of a unified approach for detecting and correcting both color aberration and color spot artifacts.

Accurate detection of color artifacts can present challenges regarding distinguishing the color artifacts from legitimate color features of an image. The detection methods of the color correction techniques described herein may advantageously utilize one or more characteristics of color artifacts that appear in images, including for example, that color artifacts may have a color bump, are located in a highlight or saturated area, have a brightness edge, are relatively small in size, and have less uniform color compared to legitimate color features. The color examples of correction techniques described herein can balance loose detection methods with conservative correction methods in order to remove unwanted color artifacts while maintaining the legitimate color features of the image.

One aspect relates to a method for correcting color artifacts in an image having a plurality of pixels, the method including receiving image data of the image, the image data including a luma (Y) component value and two chroma components values for each of the plurality of pixels in the image, detecting at least one color artifact in the Y component values of the image data, generating a correction ratio map corresponding to the plurality of pixels in the image, the correction ratio map indicating the location of the at least one color artifact in the image data, applying a plurality of directional median filters to each chroma component to generate a plurality of median values for a subset of the chroma component values, for each of the subset of chroma component values, selecting one of the plurality of median values based at least partly on a corresponding correction ratio map entry, and outputting a corrected chroma value for the pixel based at least partly on the selected one of the plurality of median values. Such a method can be implemented on an electronic device, including a portable device having a display.

Another aspect relates to system for correcting for color artifacts in an image, the system including a detection module configured to detect at least one color artifact in an image comprising a plurality of pixels, the detection module further configured to generate a correction ratio map having an entry for each of a plurality of pixels in the image, the entry indicating a type of color artifact associated with a corresponding pixel. The system may also include a correction module configured calculate a corrected chroma value of the corresponding pixel based at least partly on the entry, the entry indicating a type of color artifact associated with the corresponding pixel, the correction module further configured to select one of a plurality of directional median filters based on the entry to use to calculate a corrected chroma value, the correction module further configured to select a first directional median filter if the entry indicates that the corresponding pixel is associated with a color spot artifact and to select a second directional median filter if the entry indicates that the corresponding pixel is associated with a color aberration. The system may also include a verification module configured to verify the corrected chroma value to reduce introduction of additional artifacts or de-saturation of legitimate color features in a corrected image formed from the corrected chroma value.

Another aspect relates to a method for generating a correction ratio map for correcting color artifacts in an image, the method including receiving image data comprising the image, the image comprising a luma component and two chroma components, convolving the luma component with at least one symmetric kernel to generate a color artifact map, generating a preliminary correction ratio map based at least partly on the color artifact map, wherein the preliminary correction ratio map contains an entry corresponding to each of a plurality of pixels of the captured image; performing a gray check on at least one of the chroma components, and updating the preliminary correction ratio map based on the gray check to exclude any non-color pixels from subsequent color correction, thereby generating a final correction ratio map.

Another aspect relates to a method in an electronic device for correcting color artifacts in an image, the method comprising: receiving input values corresponding to pixels of an input image, each input value having a luma (Y) component, a first chroma component and a second chroma component, the Y components of the input values forming a Y component data set, the first chroma components of the input values forming a first chroma component data set, and the second chroma components of the input values forming a second chroma component data set; detecting at least one color artifact in the Y component data set; generating a correction ratio map having a plurality of correction entries corresponding to the input values, the correction entries indicting the location of the at least one color artifact; applying a plurality of directional median filters to the first chroma component data set to generate a plurality of median values for each component in the first chroma component data set; applying a plurality of directional median filters to the second chroma component data set to generate a plurality of median values for each component in the second chroma component data set; receiving at a correction module the plurality of median values generated from at least one of the first and second chroma component data sets and receiving the correction ratio map, and selecting one of the plurality of median values for use in generating an output image based at least partly on the correction ratio map entries; and generating an output image comprising an array of output values, each output value corresponding to an input value of the input image, said generating including determining to change a corresponding input value based on information in the correction ration map indicating the presence of a color aberration, and for an input value to be changed, generating an output value by applying one the selected one of the median values as the output value to the pixel with a first setting if the pixel is associated with a color spot artifact and with a second setting if the pixel is associated with a color aberration.

Another aspect relates to a non-transitory computer-readable medium storing instructions which, when executed, cause at least one processor to perform a method comprising receiving image data of an image, the image data including a luma (Y) component value and two chroma components values for each of the plurality of pixels in the image, detecting at least one color artifact in the Y component values of the image data, generating a correction ratio map corresponding to the plurality of pixels in the image, the correction ratio map indicating the location of the at least one color artifact in the image data, applying a plurality of directional median filters to each chroma component to generate a plurality of median values for a subset of the chroma component values, for each of the subset of chroma component values, selecting one of the plurality of median values based at least partly on a corresponding correction ratio map entry, and outputting a corrected chroma value for the pixel based at least partly on the selected one of the plurality of median values.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 4A illustrates multiple embodiments of detection kernels for detecting color artifacts in a chroma component of an image.

DETAILED DESCRIPTION

Introduction

Figure 1:
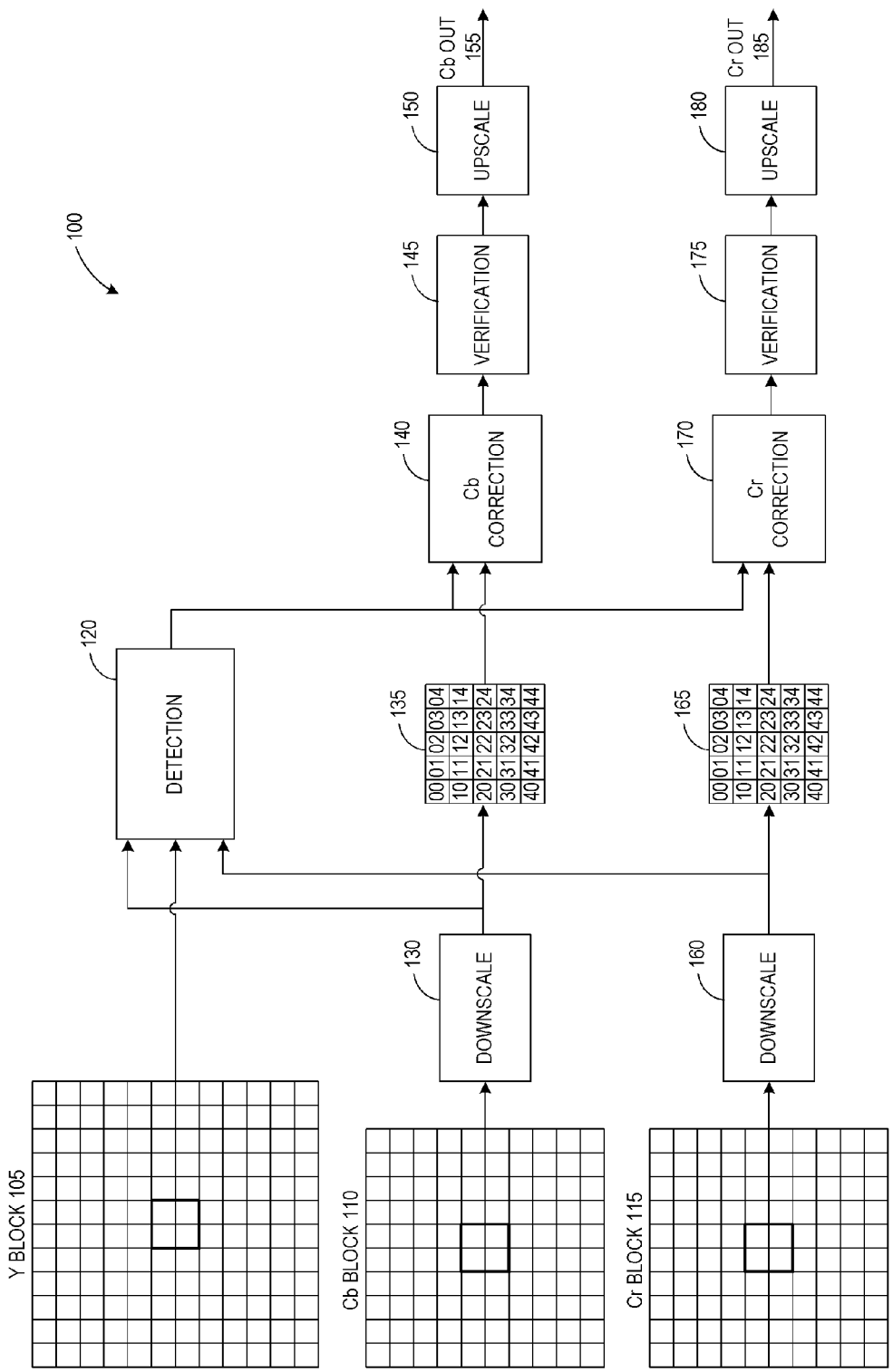
FIG. 1 illustrates a schematic block diagram of an embodiment of an adaptive color artifact correction system.

Embodiments of the disclosure include techniques related to correction of color aberration and/or color spot artifacts. For example, both color aberration and color spot artifacts can be corrected using a post-processing method implementing directional median filtering on chroma channels (YCbCr), referred to herein as Multiple Hypothesis Color Artifact Correction (MHCAC). Compared with existing methods, the MHCAC technique relaxes the requirement of color artifact detection accuracy and greatly improves the efficiency and robustness of color artifact correction in order to balance removal of unwanted color artifacts in an image with maintaining the legitimate color features of the image.

In some embodiments, the MHCAC technique employs a hypothesis detection of color artifacts to reduce the possibility false correction and thus the computational cost of correction. Detection of color artifacts can be based on two valid hypotheses: (1) that color spot artifacts and color aberration often occur near bright spots, bright lines, high-contrast edges, and saturated regions and (2) that severe color aberration often happens near saturated regions. After detection, using directional median filtering, the MHCAC technique can adaptively remove both different kinds of color artifacts—color aberration (thick lines) and color spots (thin lines or points) artifacts—in a single unified framework with two different correction settings. The MHCAC technique can use directional median filters on the chroma channels of an image, which can effectively correct color artifacts without doing damage to legitimate color features (e.g., dots, edges and corners). Although more computationally costly than mean filter kernels, in some embodiments median filters are more effective in that they are robust to outliers and more conservative in that they preserve sharp edges. In addition, directional median filters are friendly in NEON™ SIMD (Single Instruction, Multiple Data) acceleration. Using directional median filters can enable fast processing by the implementing system by presenting tighter detection criteria to reduce the number of correction points. Experimental results illustrated that the directional median filtering together with efficient color artifact detection provides an effective and robust solution to color artifact correction without compromising (i.e., desaturating) color features.

To correct both types of color artifacts in a unified framework, an embodiment of the MHCAC method may include three steps. First, the MHCAC technique can detect bright spots, bright lines, and high-contrast edges to build a correction ratio map. Second, the MHCAC technique can adaptively apply one of two different directional median filtering settings to each pixel based on the correction ratio map, one setting for each of color spots and color aberrations. Third, the MHCAC technique can verify that correction of the color artifacts did not introduce additional artifacts or unwanted desaturation.

In one embodiment of the detection step, the MHCAC technique can perform two detection measures on the luma channel of a YCbCr image. One detection measure can perform bright spot and bright edge detection, while the other measure can perform a saturation detection. This portion of detection step can build a pixel-by-pixel correction ratio map indicating the presence and location of color artifacts as well as the needed strength of color correction. The correction ratio map can then be updated by performing two detection measures on the chroma channels of the image, where one detection measure performs a grey check while the other measure performs color spot detection.

According to the values of the correction ratio map, one embodiment of the directional median filtering corrects the chroma value of each pixel with different settings and different strength as indicated by the corresponding value in the correction ratio map. For example, a first value in the correction map can indicate that no correction should be performed for the pixel, a second value can indicate that color spot correction should be performed, and a third value can indicate that color aberration correction should be performed. The corrected pixel chroma values can be verified, for example by clamping, before being output and used for construction of a corrected image. Some embodiments of the MHCAC technique can correct chroma values in the Cb and Cr channels of an image separately.

Overview of Adaptive Color Correction

FIG. 1 illustrates a schematic block diagram of an embodiment of an adaptive color artifact correction system 100. The color artifact correction system 100 includes a detection module 120 and downscale modules 130, 160 which are in data communication with the detection module 120. The adaptive color artifact correction system 100 also includes Cb correction module 140 and Cr correction module 170 which are in data communication with the detection module 120 to receive output that may include pixels and/or portions of the image that may include aberrations for correction. The Cb correction module 140 is also in data communication with the downscale module 130, and Cr correction module 170 is in data communication with the downscale module 160, for receiving downscaled Cr and Cr image data, respectively. The Cb correction module 140 is in data communication with a verification module 145, which is in data communication with an upscale module 150. The upscale module 150 is configured to provide an output of upscaled Cb data. Similarly, the Cr correction module 170 is in data communication with a verification module 175, which is in data communication with an upscale module 180. The upscale module 180 is configured to provide an output of upscaled Cr data. The adaptive color artifact correction system 100 and components thereof are further described in the below.

As illustrated in FIG. 1, the adaptive color artifact correction system 100 receives input data that can include a Y block 105 of image data, a Cb block 110 of image data corresponding to the Y block 105, and a Cr block 115 of image data corresponding to the Y block 105 and the Cb block 110. The Y block 105 can include some 3×3 dilation in the illustrated example, while the Cb block 110 and Cr block 115 may not. Input Y block 105 data is received at the detection module 120. Input image components Cb block 110 and Cr block 115 can be transformed into downscaled Cb block 135 and downscaled Cr block 165, respectively, by the downscale modules 130, 160 before being received at the detection module 120. Although the downscale modules 130, 160 are illustrated as being separate, with one dedicated to each of the Cb and Cr components, in other embodiments a single downscale module can be used to process both the Cb and the Cr components. In other embodiments, the Cb and Cr component may not be downscaled prior to reception by the detection module 120. Detection module 120 may be configured to detection processes to the Y 105, Cb 110, and Cr 115 blocks to detect color artifacts in the image data and to distinguish between color spot artifacts and color aberration, as will be discussed in more detail below. For example, certain aspects of detection on the Y block 105 are described in reference to FIGS. 3A and 3B, and certain aspects of detection on the Cr block 110 and the Cr block 115 are described in reference to FIGS. 4A and 4B. In some embodiments, detection module 120 can build a pixel-by-pixel correction ratio map indicating the type of color artifacts and the location (in which pixels the aberration occurs). In some embodiments, the values in the correction ratio map can indicate a type and/or strength of correction to be applied at each pixel.

The color aberration detection processes may be based on the hypothesis that color spot artifacts and color aberration often occur near bright spots, bright lines, high-contrast edges, and saturated regions as well as the hypothesis that color aberration often occurs near saturated regions. Color spots can be, for example, pixel clusters where the center color is different from the color of the surrounding regions in the pixel cluster. Color aberration can appear as fringes of color, or falsely colored edges, along boundary lines between dark and light regions in an image.

In one embodiment, the detection module 120 can use one or more symmetric kernels on the luma component (Y) data 105 to detect color artifacts including any bright spots, bright lines, and high-contrast edges. The detection module 120 can build a color artifact map indicating the locations of these color artifacts. The detection module 120 can also estimate a saturation map from the brightness channel, and can build a preliminary correction ratio map by combining the color artifact map and saturation map. The detection module 120 can, in some embodiments, perform a gray check and color spot detection on the chroma channels (Cb and Cr). Using the information from the gray check and color spot detection performed on the chroma channels, the detection module 120 can update the preliminary correction ratio map to exclude non-color (i.e., black and white) pixels by checking chroma channels (Cb and Cr) of the pixels in the preliminary correction ratio map and changing the correction ratio map value corresponding to non-color pixels to indicate that no correction is needed at that pixel. Accordingly, the detection module 120 can generate the final correction ratio map.

The downscaled Cb block 135 and downscaled Cr block 165 as well as the correction ratio map from detection module 120, can be received at Cb correction module 140 and Cr correction module 170 (which may be collectively referred to herein as "correction modules 140, 170"). The correction modules 140, 170 can use the values in the correction ratio map to determine if and how to correct the chroma values of each pixel in the image. For example, a first value (or range of values) in the correction map can indicate that no correction should be performed for the pixel, a second value (or range of values) can indicate that color spot correction should be performed, and a third value (or range of values) can indicate that color aberration correction should be performed.

The correction modules 140, 170 can use directional median filtering to correct color artifacts, and can use adaptively-selected different filtering techniques for color spot artifacts and color aberration. For example, a correction module 260 illustrated in FIG. 2 can be configured to, and is operable to, apply directional median filtering on chroma channels with two settings, where a first setting may be a strong setting for color aberration and a second setting may be a weak setting for color spot artifacts. Median filtering can be well-suited to keep desired color features in an image while correcting color artifacts. Compared with non-directional median filtering, directional median filtering is better able to preserve fine color features (e.g., corners and lines) and has a reduced computational cost. In addition, the correction modules 140, 170 can control the strength of correction applied to an image or portion of an image by adjusting the direction of the median filter. The correction modules 140, 170 can output corrected chroma values for each pixel of the downscaled Cb and Cr chroma channels. Although the correction modules 140, 170 are illustrated as being separate modules, with one dedicated to each of the Cb and Cr components, in other embodiments a single correction module can be used, for example, as illustrated by correction module 260 of FIG. 2.

The corrected Cb and Cr chroma values can be received by the verification modules 145, 175. Although the verification modules 145, 175 are illustrated as being separate modules, with one dedicated to each of the Cb and Cr components, in other embodiments a single verification module can be used to process data from both chroma channels. The verification modules 145, 175 can perform a pixel-by-pixel analysis of the corrected chroma values in order to verify that correction of the color artifacts did not introduce additional artifacts or unwanted desaturation, and can clamp the corrected chroma values to a specified range. For instance, after correction, chroma correction implementing directional median filtering might have transformed a black or white pixel into a colorful pixel due to its colorful neighborhood. To avoid introducing such additional color artifacts, the verification modules 145, 175 can perform pixel-by-pixel clamping on the chroma values of each pixel. In one example, the verification modules 145, 175 clamp the output Cb/Cr values for each pixel into a range between 128 and the pixel's input value, due to the fact that the pixel is a black or white pixel when Cr=Cb=128. In this way, the clamping process can avoid the problematic case of the MHCAC making a non-color pixel more colorful.

In the illustrated embodiment, the Cb block 110 and Cr block 115 were transformed into downscaled Cb block 135 and downscaled Cr block 165, respectively, by the downscale modules 130, 160 before undergoing color correction. Accordingly, the downscaled Cb block 135 and downscaled Cr block 165 are transformed by the upscale modules 150, 180 into their original size before the final corrected Cb component 155 and final corrected Cr component 185 are output for constructing a color corrected image.

System Overview

Figure 2:
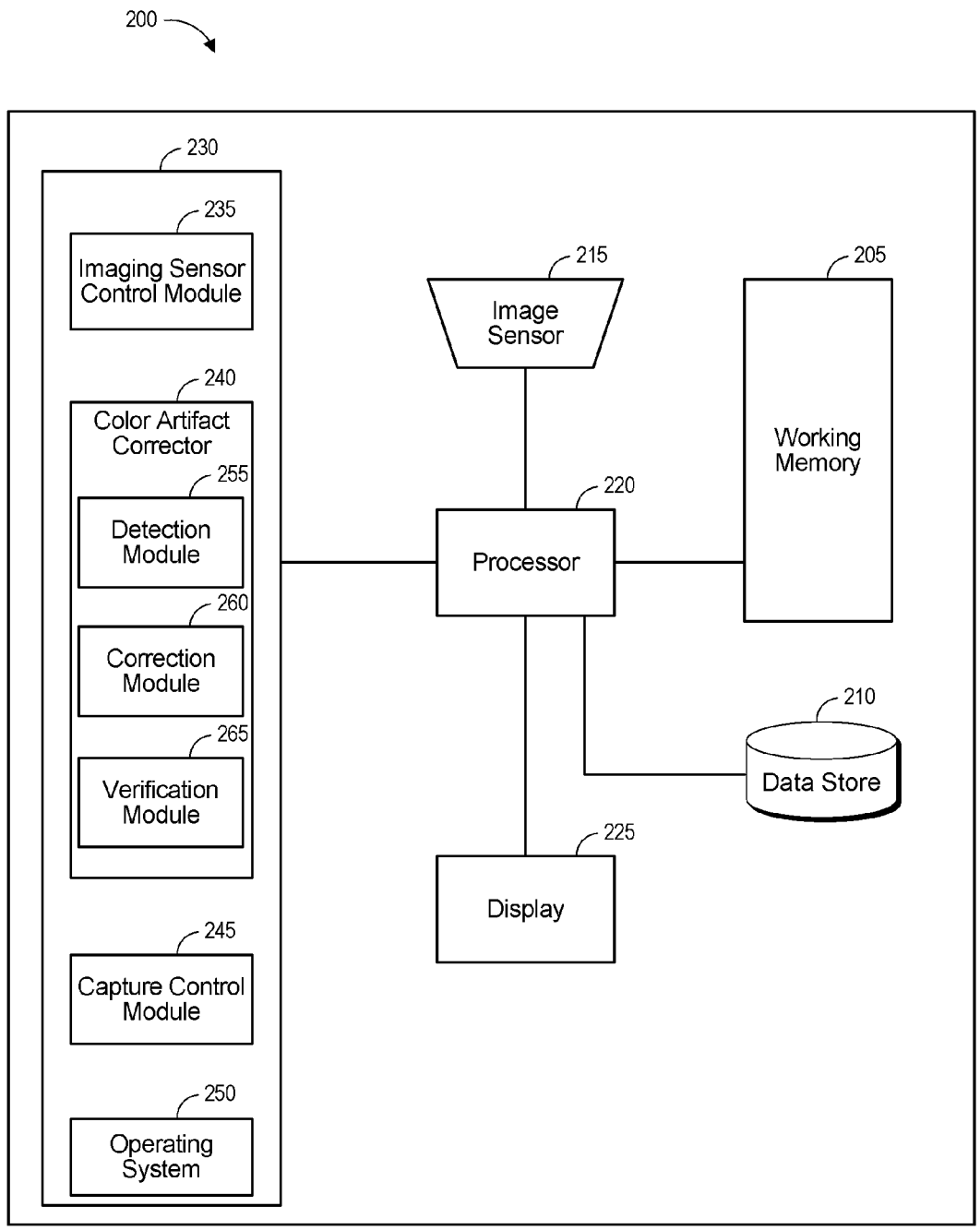
FIG. 2 illustrates a schematic block diagram of an example system with adaptive color artifact correction capabilities.

FIG. 2 illustrates a schematic block diagram of an example system 200 with adaptive color artifact correction capabilities, the system 200 having a set of components including a processor 220 linked to an imaging sensor 215. A working memory 205, storage (or "data store") 210, electronic display 225, and memory 230 are also in communication with the processor 220.

In some implementations, system 200 may be a mobile computing device such as cell phone, digital camera, tablet computer, music player, personal digital assistant, or the like. System 200 may also be a more stationary device such as a desktop personal computer, video conferencing station, or the like that uses an internal or external camera for capturing images. System 200 can also be a combination of an image capture device and a separate processing device receiving image data from the image capture device. A plurality of applications may be available to the user on system 200. These applications may include traditional photographic applications, capture of still images and video, and adaptive color correction applications, among others.

The image capture system 200 includes the image sensor 215 for capturing images. The image sensor 215 can be, for example, a charge-coupled device (CCD), a complementary metal-oxide semiconductor (CMOS) sensor, or the like. The image sensor 215 may be coupled to the processor (or "image processor") 220 to transmit a captured image to the image processor 220. The image processor 220 may be configured to perform various operations on a received captured image in order to output a high quality color corrected image, as will be described in more detail below.

Processor 220 may be a general purpose processing unit or a processor specially designed for imaging applications. As shown, the processor 220 is connected to a memory 330 and a working memory 205. In the illustrated embodiment, the memory 230 stores an imaging sensor control module 235, color artifact correction module 240, capture control module 245, and operating system 250. These modules include instructions that configure the processor to perform various image processing and device management tasks. Working memory 205 may be used by processor 220 to store a working set of processor instructions contained in the modules of memory 330. Alternatively, working memory 205 may also be used by processor 220 to store dynamic data created during the operation of device 200.

As mentioned above, the processor 220 is configured by several modules stored in the memory 230. The imaging sensor control module 235 includes instructions that configure the processor 320 to adjust the focus position of imaging sensor 215. The imaging sensor control module 235 also includes instructions that configure the processor 220 to capture images with the imaging sensor 215. Therefore, processor 220, along with image capture control module 235, imaging sensor 215, filter 260, and working memory 205 represent one means for capturing an image or sequence of images to be corrected for color artifacts. In some embodiments, all or part of the functionality described in the modules may be implemented in hardware, software or a combination of hardware and software.

The color artifact correction module 240 includes instructions that configure the processor 220 to correct color artifacts in a captured image, and can include three sub-modules such as the illustrated detection module 255, correction module 260, and verification module 265. For example, the detection module 255 can generate a correction ratio map by analyzing the image data according to one or more hypotheses on the formation and characteristics of color artifacts in image data. For example, the detection module 255 may include instructions that configure the processor 220 to detect color artifacts based on that color artifacts may have a color bump, are likely to be located in a highlight or saturated area, have a brightness edge, are relatively small in size, and have less uniform color compared to legitimate color features. Further, the detection module 255 can include instructions that configure the processor to distinguish between color spot artifacts and color aberrations. For example, color spot artifacts and color aberration can be distinguished based on adjacent features in one embodiment. For example, color spot artifacts often occur near bright spots, bright lines, high-contrast edges, and saturated regions while color aberration often occurs near saturated regions.

The detection module 255 can apply detection kernels to one or both of the luma and chroma channels of a captured image to build a correction ratio map, as will be discussed in more detail below. A correction ratio map value corresponding to each pixel in the image can indicate a type and strength of correction to be performed on the chroma value of the pixel. For example, a first value (or range of values) in the correction map can indicate that no correction should be performed for the pixel, a second value (or range of values) can indicate that color spot correction should be performed, and a third value (or range of values) can indicate that color aberration correction should be performed.

In some embodiments, the detection module 255 can implement a two-phase approach to generating the correction ratio map. In the first phase, the detection module 255 can perform two detection measures on the luma channel of a YCbCr image. One detection measure can perform bright spot and bright edge detection, while the other measure can perform a saturation detection. This can build a pixel-by-pixel correction ratio map indicating the presence and location of color artifacts as well as the needed type and strength of color correction. In the first phase, the detection module 255 can update the correction ratio map can by performing two detection measures on the chroma channels of the image, where one detection measure performs a grey check while the other measure performs color spot detection.

The correction module 260 can apply directional median filtering on chroma channels with two different settings, one for each of color spots artifacts and color aberration. The correction module 260 can adaptively apply the directional median filtering to correct each pixel (for example the pixel's chroma value) with different settings and different strengths determined by the entry corresponding to the pixel in the correction ratio map. Median filtering is well-suited to keep desired color features in an image while correcting color artifacts, and directional median filtering is better able to preserve fine color features (e.g., corners and lines) and has a reduced computational cost compared with non-directional median filtering. In addition, directional median filtering is advantageous as the correction module 260 can control the strength of correction applied to an image or portion of an image by adjusting the direction of the median filter.

In some embodiments, for each pixel in each chroma channel (Cb and Cr), the correction module 260 can apply a median filter along each of four directions to obtain four median values. The median values can be compared to the original chroma value and an appropriate corrected chroma value can be based on a conservative or aggressive median value as indicated by the correction ratio map. A conservative median value can be closest to the original input chroma value of the pixel and an aggressive median value can be farthest from the original input chroma value of the pixel.

The verification module 265 can analyze the corrected chroma values $C_{corrected}$ to ensure that color artifacts are corrected without causing additional artifacts or de-saturation. Although directional median filtering generally works well to preserve legitimate color features, it is possible that it may cause some additional color artifacts in some instances. For instance, after correction, the directional median filtering might have transformed a black or white pixel into a colorful pixel due to its colorful neighborhood. To avoid introducing such additional color artifacts, the verification module 265 can perform clamping.

Capture control module 245 may include instructions that control the overall image capture functions of the system 200. For example, in an embodiment the capture control module 245 may include instructions that call subroutines to configure the processor 220 to capture image data of a target image scene using the imaging sensor 215. Capture control module 245 may then call the color artifact correction module 240 to correct color artifacts in the captured image data. Capture control module 245 may also call other processing modules not illustrated, for example a lens control module for minimizing detected color aberration.

In the embodiment illustrated in FIG. 2, the operating system module 250 can configure and/or control the processor 220 to manage the memory and processing resources of the system 200. For example, operating system module 255 may include device drivers to manage hardware resources such as the electronic display 225, storage 210, or imaging sensor 215. Therefore, in some embodiments, instructions contained in the image processing modules discussed above may not interact with these hardware resources directly, but instead interact through standard subroutines or APIs located in operating system component 250. Instructions within operating system 250 may then interact directly with these hardware components.

The processor 220 may be further configured to control the display 225 to display the captured image to a user. The display 225 may be external to an imaging device including the image sensor 215 or may be part of the imaging device. The display 225 may also be configured to provide a view finder for a user prior to capturing an image, or may be configured to display a captured image stored in memory or recently captured by the user. The display 225 may comprise an LCD or LED screen, and may implement touch sensitive technologies.

Processor 220 may write data to storage module 210, for example data representing captured images, correction ratio map values, and corrected chroma values. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture system 200. For example, the storage module 210 may include a ROM memory containing system program instructions stored within the image capture system 200. The storage module 210 may also include memory cards or high speed memories configured to store captured images which may be removable from the camera.

Although FIG. 2 depicts an example of a system having some separate components, for example, a processor 220, an image sensor 215, and memory 205, a person having ordinary skill in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components—memory component 230 comprising several modules and a separate memory 205 comprising a working memory—a person having ordinary skill in the art would recognize that such a system may have other embodiments utilizing different memory architectures. For example, a design may utilize ROM or static RAM memory for the storage of processor instructions implementing the modules contained in memory 230. Alternatively, processor instructions may be read at system startup from a disk storage device that is integrated into system 200 or connected via an external device port. The processor instructions may then be loaded into RAM to facilitate execution by the processor. For example, working memory 205 may be a RAM memory, with instructions loaded into working memory 205 before execution by the processor 220.

Overview of Correction Map Construction

Figure 3A:
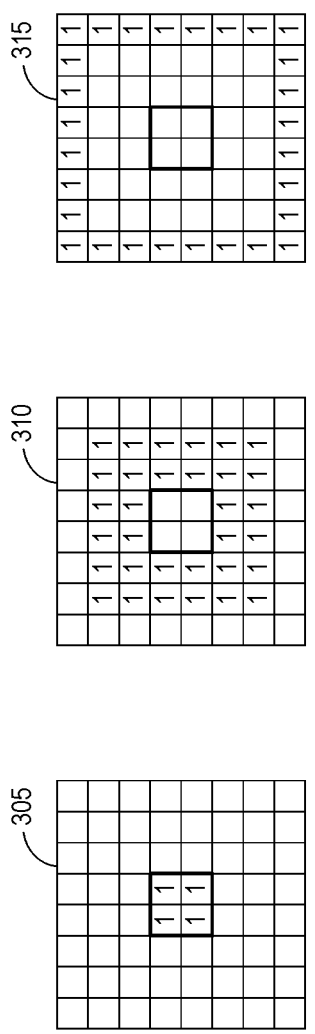
FIG. 3A illustrates multiple embodiments of detection kernels for detecting color artifacts in a luma component of an image.
Figure 3B:
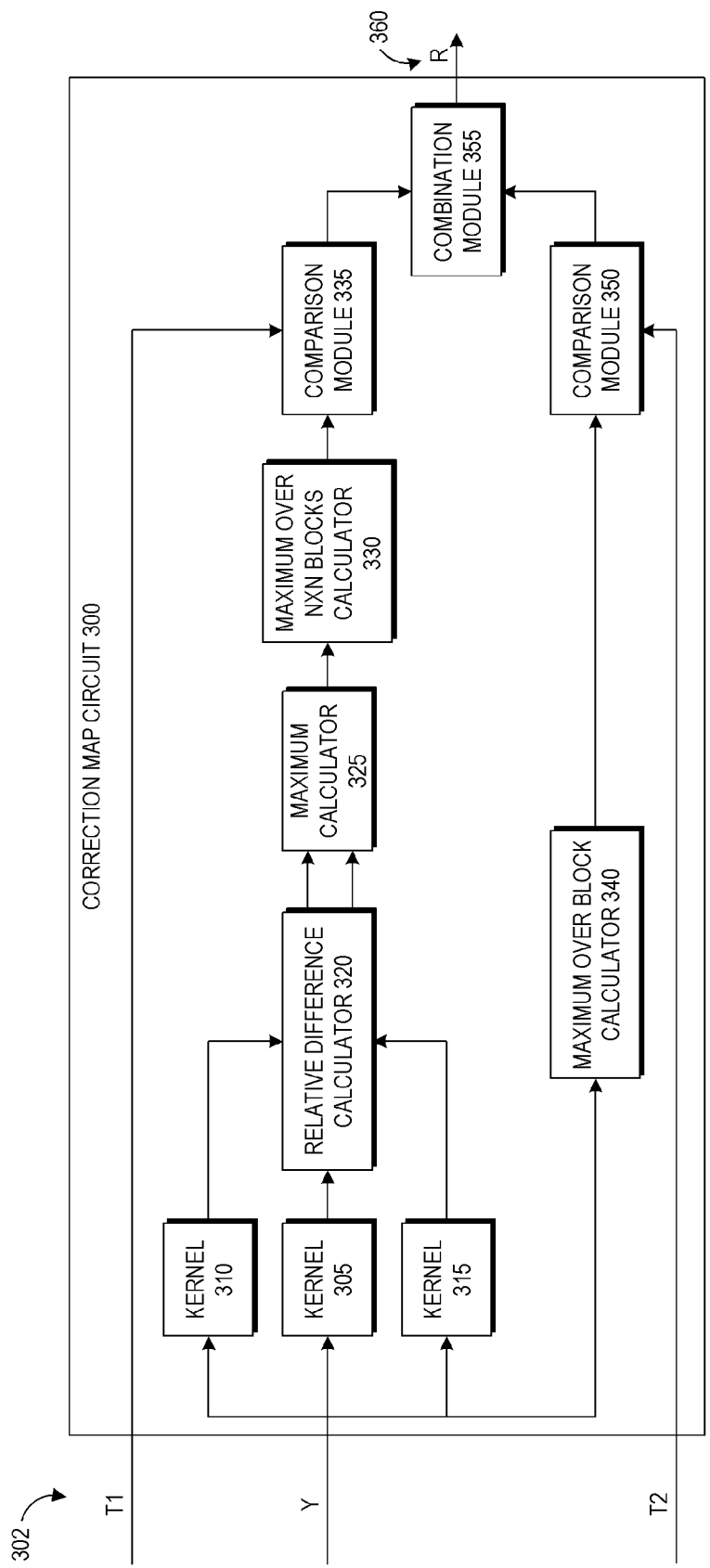
FIG. 3B illustrates an embodiment of a correction map circuit that can implement the detection kernels of FIG. 3A.

FIG. 3A illustrates multiple embodiments of color artifact detection kernels 305, 310, 315 for detecting color artifacts in a luma component of an image, and FIG. 3B illustrates an embodiment of a correction map circuit 300 that can implement the kernels 305, 310, 315 of FIG. 3A. Convolving the illustrated symmetric kernels 305, 310, 315 with the input image data, or with the Y component of the image data, can provide a color artifact map indicating locations, or potential locations, of color artifacts in the image data. Applying kernel 305 with the input image data can perform downsampling by determining a single "super pixel" value for each block consisting of 2×2 pixels. The super pixel value can be an aggregate or average of the values of each of the pixels in the 2×2 block, for example. The output block can be one quarter the size of the original in the illustrated example. Convolving kernel 310 with the image data can provide an indication regarding whether the super pixel value is brighter than a local neighborhood of pixels, and convolving kernel 315 with the image data can provide an indication regarding whether the super pixel value is brighter than a far neighborhood of pixels.

As illustrated in FIG. 3B, the correction map circuit 300. As used herein, the term "circuit" is used a broad term and refers to functionality that can be implemented in hardware, software, or a combination of hardware and software (for example, in reference to a correction map circuit, correction map updating circuit, and an adaptive color artifact correction circuit). The correction map circuit 300 can have inputs 302 including a first threshold T1, a luma component Y of image data, and a second threshold T2. The luma component can be convolved with each of the kernels 305, 310, 315 illustrated in FIG. 3A. The values of a given pixel in the output data from each of the kernels 305, 310, 315 can be calculated by multiplying each kernel value by the corresponding input luma component pixel values. For example, in one embodiment, the output data from kernel 305 can be calculated according to Equation (1), the output data from kernel 310 can be calculated according to Equation (2), and the output data from kernel 315 can be calculated according to Equation (3), below.

$$Y_1 = Y * (H_1/4) \quad (1)$$

$$Y_2 = Y * (H_2/32) \quad (2)$$

$$Y_3 = Y * (H_3/28) \quad (3)$$

The outputs $Y_1$, $Y_2$, and $Y_3$ can be provided to the relative difference calculator 320. The relative difference calculator 320 can provide two relative difference outputs, in some embodiments, according to Equations (4) and (5), below.

$$(Y_1 - Y_2)/Y_2 \quad (4)$$

$$(U_1 - Y_3)/Y_3 \quad (5)$$

The maximum value of the relative difference outputs can be determined by the maximum calculator 325 and provided to the maximum over N×N blocks calculator 330, which can search for and output the maximum value in the neighborhood of N×N blocks. In the illustrated example, the N×N blocks calculator 330 can search within the neighborhood of 3×3 blocks, however the kernels 305, 310, 315 can be designed for other sized pixel neighborhoods in other embodiments. Accordingly, the relative difference calculator 320 and maximum calculator 325 operating on the input image data produces a relative difference map (which can be quarter size relative to the input image data), on which the N×N blocks calculator 330 can search for the maximum value in the 3×3 neighborhood. The output of the maximum over N×N blocks calculator 330 can be output to the comparison module 335 for comparison with the first threshold T1.

The input luma component can be provided to the maximum over block calculator 340, which searches for and outputs the maximum value in the neighborhood of N×N blocks. The output of the maximum over block calculator 340 can be received at the comparison module 350 for comparison to the second threshold T2. The results of comparison module 335 and comparison module 350 can be combined at the combination module 355, and the output R 360 can be provided as a correction ratio map or preliminary correction ratio map. The output R 360 can contain one value for each pixel in the input image data.

FIG. 4A illustrates two examples of kernels 405, 410 that can be used for detecting color artifacts in a chroma component of an image. Kernel 405 is one example of a Laplacian convolution kernel that can highlight regions of gradient or intensity change above a threshold by calculating the second derivative of intensity with respect to position, and can therefore be used for edge detection. Kernel 405 can be used for detecting the locations of color spot artifacts. Kernel 410 can be used to perform a saturation detection, which checks to see whether a center pixel is located near the saturation area. Kernel 410 when convolved with the image data can provide a calculated difference between the center pixel and surrounding near and far neighborhoods of pixels to indicate the presence of relatively larger color spots.

Figure 4B:
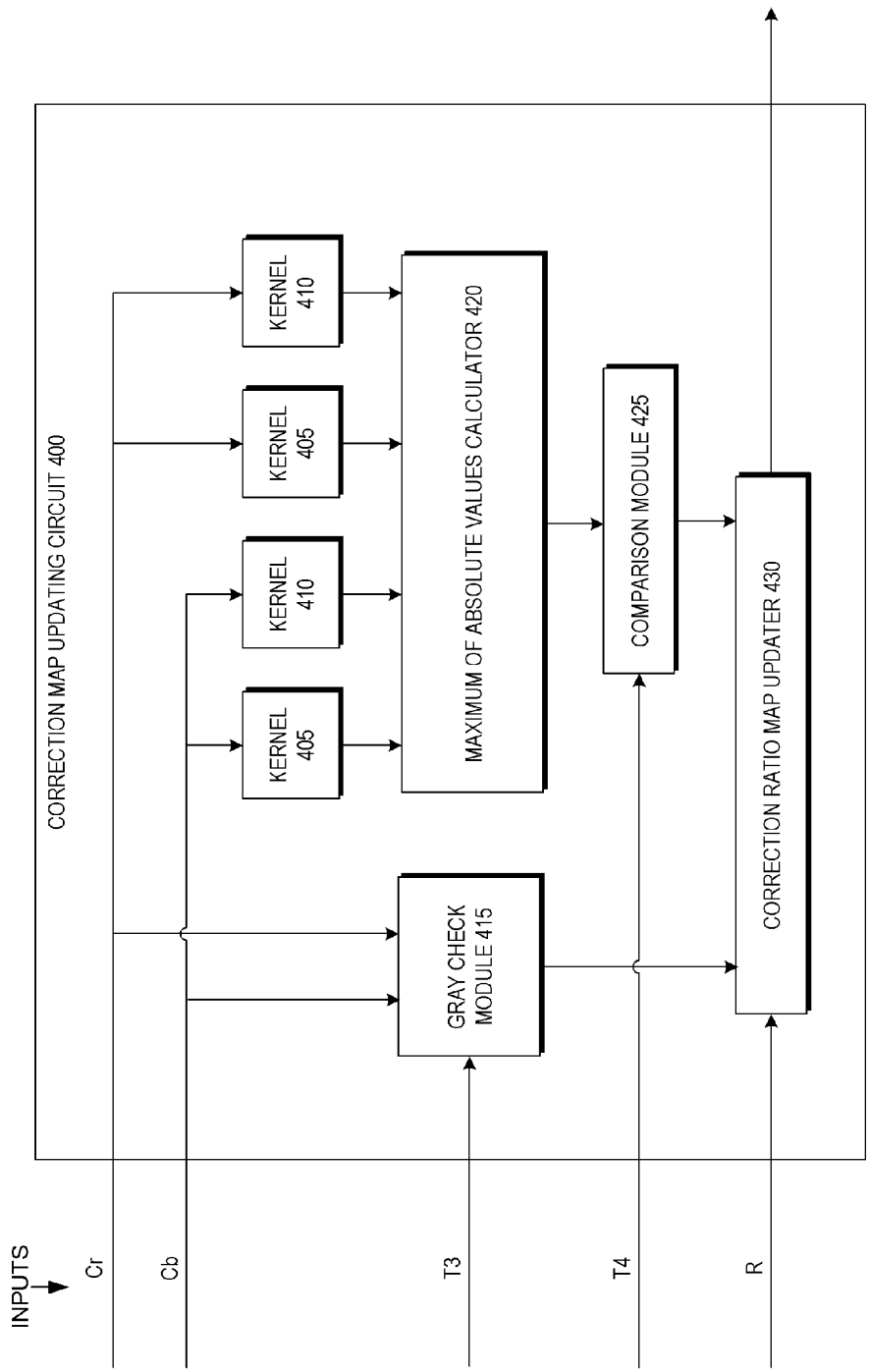
FIG. 4B illustrates an embodiment of a correction map updating circuit that can implement the detection kernels of FIG. 4A.

FIG. 4B illustrates an embodiment of a correction map updating circuit 400 that can implement the kernels 405, 410 of FIG. 4A. Convolving the illustrated kernels 405, 410 with the input image data, or with the Cb and Cr components of the image data, can provide values to refine the preliminary correction ratio map by excluding non-color pixels. A correction ratio map output from the correction map updating circuit 400 can be used to determine which pixels should be color corrected.

The correction map updating circuit 400 can have inputs that include the image data chroma components Cb and Cr, a third threshold T3, a fourth threshold T4, and the preliminary correction ratio map R. As illustrated in FIG. 4B, the correction map updating circuit 400 includes a gray check module 415 that receives threshold T3 as an input and also receives the Cb and Cr components as input. The gray check module 415 is configured to compare the input Cr and Cb pixel values to a threshold to determine information that can be used to assist in determining the location of and excluding non-color pixels from the correction ratio map. More specifically, in some embodiments the gray check module 415 is configured to compare corresponding pixel values of the Cr and Cb components to threshold T3, for example, as shown in Equation (6) below. This can be performed for each of the pixels in the CR and Cb components. An output of the gray check module 415 may be provided to a correction ratio map updater 430 to set corresponding values in the correction ratio map, or to indicate not to set (or update) the corresponding value in the correction ration map, based on the output from the gray check module 415.

Both the Cr and Cb components can be processed to determine locations of color aberrations, for example, color spots. In the embodiment illustrated in FIG. 4B, each of the kernels 405, 410 of FIG. 4A are convolved with kernel 405 and kernel 410 to determine the locations of color spots. Each of the convolutions results in a resultant data set that includes values that spatially correspond to the Cr and Cb component pixel values, which are input to the maximum absolute values calculator 420. The values of a given pixel in the output data from each of the kernels 405, 410 can be calculated by multiplying each kernel value by the corresponding input chroma component pixel values. The output from the kernels 405, 410 can be provided to the maximum of absolute values calculator 420 in order to determine the maximum of the four input convolved Cr and Cb values for a pixel. This maximum can then be input into the comparison module 425 for comparison to the fourth threshold T4. The comparison module 425 can compare the maximum to the threshold T4 to determine whether the maximum is less than the threshold, and can provide this data to the correction ratio map updater 430.

The outputs from the gray check module 415 and the comparison module 425 can be provided to the correction ratio map updater 430 to update the values of the preliminary correction ratio map R. For example, in one embodiment, the correction ratio map value for a pixel can be set to zero, indicating that no correction should be performed at the pixel, if the absolute value of the difference between both the Cr and the Cb value for the corresponding pixel and 128 are less than the third threshold T3, according to the gray check modeled by Equation (6).

$$R=0 \text{ if } |Cr-128|<Th3 \text{ and } |Cb-128|<Th3 \quad (6)$$

The correction ratio map value for a pixel can be set to zero if the preliminary correction ratio map value R for the pixel is equal to one and if the output C' of the comparison module 425 is less than the fourth threshold Th4 as indicated by the color spot detection, according to Equation (7).

$$R=0 \text{ if } R==1 \text{ and } C'<Th4 \quad (7)$$

In some embodiments, Th3 can be set equal to 15 and Th4 can be set equal to 12. In another embodiment, Th3 can be set equal to 5 and Th4 can be set equal to 10. During or after performing the gray check and color spot detection, the detection module 255 can update the preliminary correction ratio map values R to generate and provide as an output a final correction ratio map.

Overview of Adaptive Color Artifact Correction

Figure 5B:
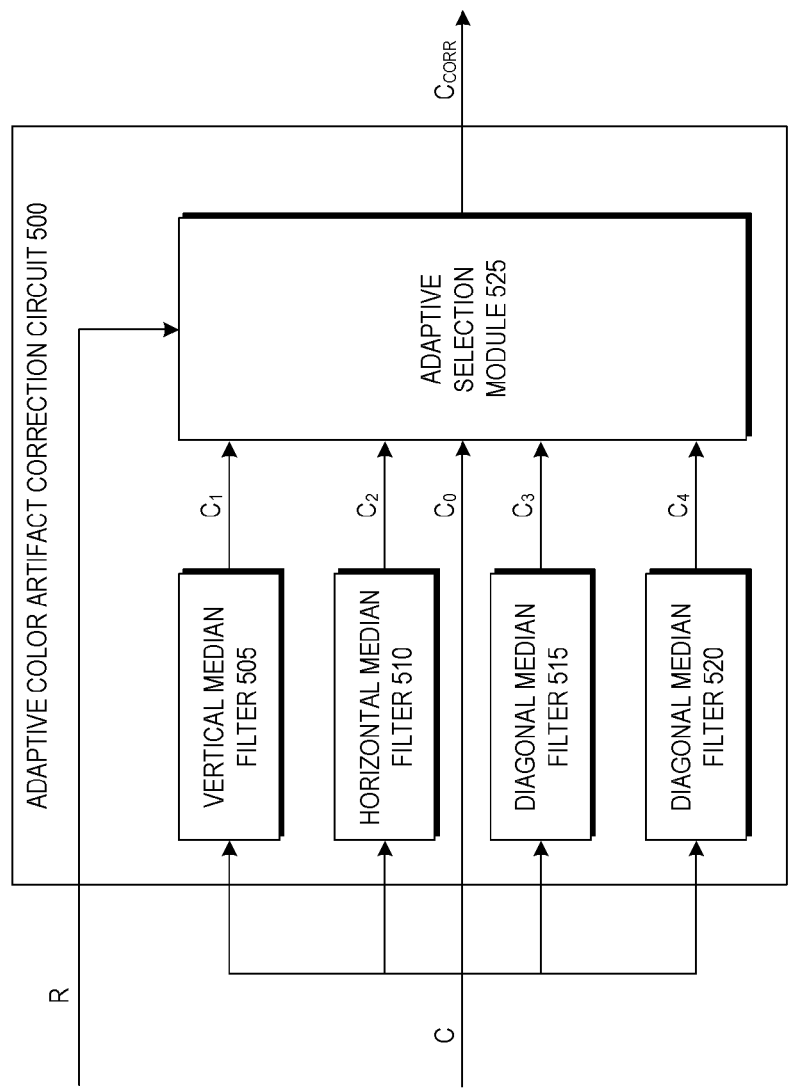
FIG. 5B illustrates an embodiment of an adaptive color artifact correction circuit that can implement the directional median filters of FIG. 5A.
Figure 5A:
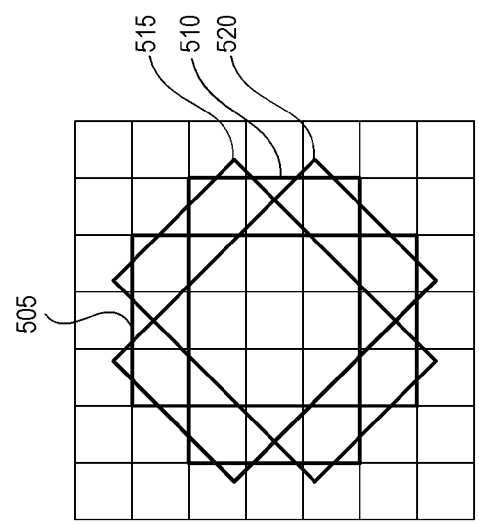
FIG. 5A illustrates an embodiment of directional median filters.
Figure 5C:
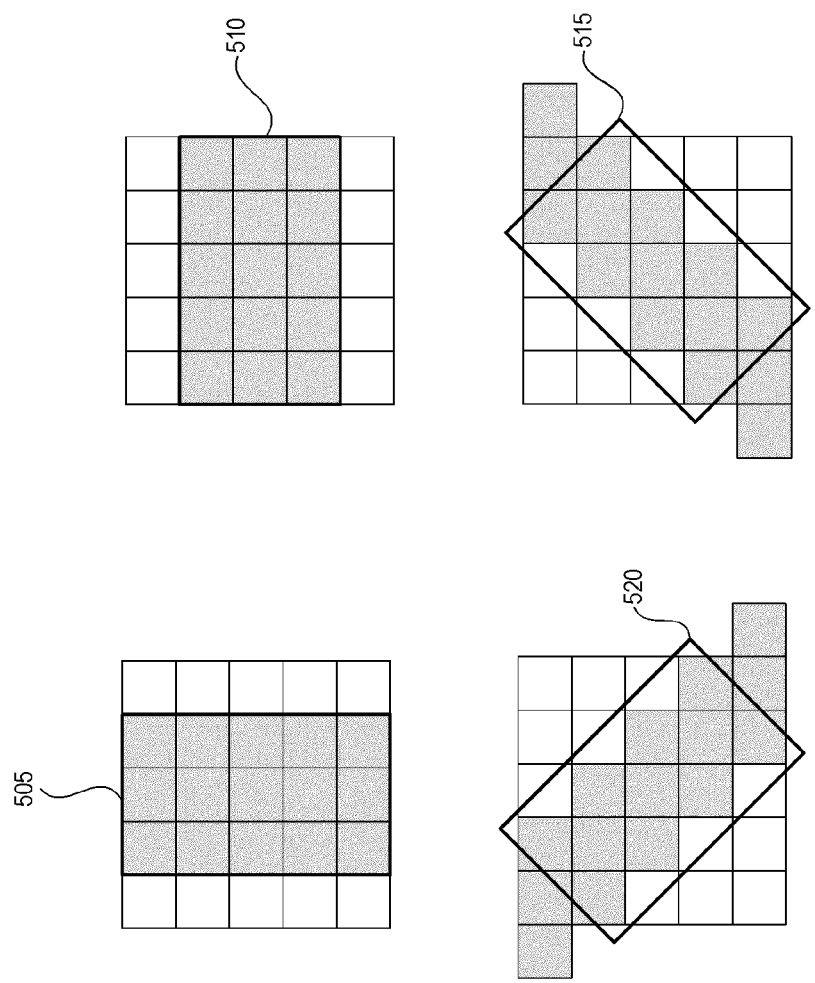
FIG. 5C illustrates example pixels that can be affected by application of the directional median filters of FIG. 5A.

FIG. 5A illustrates an embodiment of directional median filters 505, 510, 515, 520. FIG. 5B illustrates an embodiment of an adaptive color artifact correction circuit 500 that can implement the filters 505, 510, 515, 520 of FIG. 5A. As illustrated, the filters include a vertical 5×3 median filter 505, a horizontal 5×3 median filter 510, a first diagonal 5×3 median filter 515 offset approximately 45 degrees from the vertical filter 505, and a second diagonal 5×3 median filter 520 perpendicular to the first diagonal filter 515. The four 5×3 directional median filters 505, 510, 515, 520 of FIG. 5A are illustrative of one embodiment of the MHCAC technique, and median filters of other dimensions and directions can be used in other embodiments. FIG. 5C illustrates example pixels that can be affected in a 5×5 block by application of the directional median filters of FIG. 5A. For application of diagonal median filters 515 and 520, values from pixels outside of the 5×5 block boundary may be used. In one embodiment, the nearest border pixel can be extended as far as necessary to provide values for convolution. In another embodiment, any pixel in the output median value which would require a value from beyond the block edge may be skipped. Other edge handling techniques can be used in other examples.

The correction circuit 500 can be provided with the correction ratio map values R and chroma values C for each pixel in the input image data. In some embodiments, the correction circuit 500 can operate separately on the chroma values from the Cb and Cr components of the input image data. The input chroma value for each pixel can be convolved with each of the vertical 505, horizontal 510, first diagonal 515, and second diagonal 520 median filters, providing output median values $C_1$, $C_2$, $C_3$, and $C_4$, respectively. In some embodiments, $C_1$, $C_2$, $C_3$, and $C_4$ may denote the median values sorted in ascending order from lowest to highest. In some embodiments, aggressive and conservative median values can be calculated according to Equations (8), and (9), respectively, shown below.

$$C_{dmf}=\arg \min_{i=1,2,3,4}|C_i-128| \quad (8)$$

$$C_{dmf}=\arg \min_{i=1,2,3,4}|C_i-C_0| \quad (9)$$

The aggressive median value can be the most desaturated (in term of color) among the four median values, while the conservative median value can be the closest to the input value among the four median values. The aggressive median value can be used to provide strong correction on color aberration and the conservative median value can be used to provide weak correction on color spot artifacts.

The input chroma value $C_0$, the output values $C_1$, $C_2$, $C_3$, and $C_4$, and the correction ratio map value R can be input into the adaptive selection module 525. If the correction ratio map corresponding to a pixel is R==0, which indicates that this pixel was not detected as belonging to a color artifact, the corrected chroma value for the pixel can be set to $C_{corrected}=C_0$, where $C_0$ is the input or current chroma value of the current pixel. If the correction ratio map value for the pixel is in the range of 0<=R<=1, then the pixel was detected as being proximate to or part of a color spot artifact such as a color spot or a thin line, and the corrected chroma value $C_{corrected}$ for the pixel can be determined by selecting the conservative (i.e., smallest difference between the output value and the input value $C_0$) median value from $C_1$, $C_2$, $C_3$, and $C_4$ and weighting it with the input chroma value $C_0$ as follows:

$$C_{corr}=C_k, k=\arg \min_{i=1,2,3,4}|C_i-C_0| \quad (10)$$

A pixel within around four or five pixels can be considered proximate and can fall within the range of 0<=R<=1 correction ratio map values in one embodiment.

If the correction ratio map corresponding to the pixel is R==2, which indicates that the pixel was detected as being close to a saturated region or regions and to possible color aberration, the adaptive selection module 525 can obtain the corrected chroma value $C_{corrected}$ for the pixel by selecting the aggressive (i.e., most desaturated compared to the input value $C_0$) median value as follows:

$$C_{corrected} = \arg\min_{i=1,2,3,4} |C_i - 128| \qquad (11)$$

Since the aggressive direction for median filtering is often perpendicular to the conservative direction, the adaptive selection module 525 can first search for the conservative direction by determining which of the resulting chroma values $C_1$, $C_2$, $C_3$, and $C_4$ has the smallest difference with the current value $C_0$. The aggressive correction value either be determined by determining which of the resulting chroma values $C_1$, $C_2$, $C_3$, and $C_4$ results from the median filter in the opposite direction as the conservative direction, that is perpendicular to the conservative direction, or by determining which of the resulting chroma values $C_1$, $C_2$, $C_3$, and $C_4$ has the largest difference with the current value $C_0$.

Overview of an Example Adaptive Color Artifact Correction Process

Figure 6:
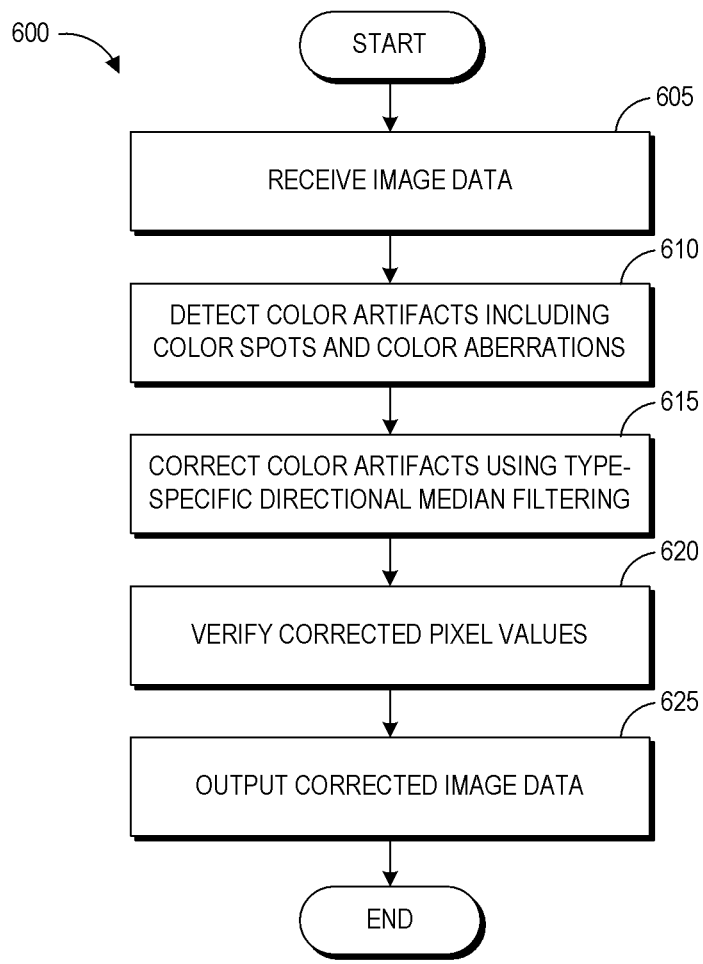
FIG. 6 illustrates an embodiment of an adaptive color artifact correction process.

FIG. 6 illustrates an embodiment of an adaptive color artifact correction process 600. Although discussed in the context of the systems and components of FIGS. 1, 2, 3B, 4B, and 5B, the process 600 can be implemented on any system having adaptive color correction capabilities.

To begin, at block 605, the color artifact corrector 240 of the image system 200 receives image data, for example from image sensor 215. In other embodiments, a module or processor in a computing device separate from an imaging device may receive the image data for post-capture processing.

At block 610, the detection module 255 generates a correction ratio map by analyzing the image data according to one or more hypotheses on the formation and characteristics of color artifacts in image data. For example, the detection module 255 may detect color artifacts based on the one or more of the hypotheses that color artifacts typically have a color bump, are located in a highlight or saturated area, have a brightness edge, are relatively small in size, and have less uniform color compared to legitimate color features. Further, the detection module 255 can distinguish between two classifications of color artifacts—color spot artifacts and color aberrations. This distinguishing can be based on the hypothesis that color spot artifacts often occur near bright spots, bright lines, high-contrast edges, and saturated regions as well as the hypothesis that color aberration often occurs near saturated regions.

As discussed above, one embodiment of color artifact detection can involve a two-phase process of building a correction ratio map from the luma (Y) component or brightness component in the image data and correcting the correction ratio map using the chroma (Cb and Cr) channels of the image. The detection module 255 can apply filters to the luma component to detect bright spots and bright edges and to perform a saturation check, and can also in some embodiments estimate a saturation map from the luma component. This can provide preliminary values for a pixel-by-pixel correction ratio map indicating the presence and location of color artifacts as well as the needed strength of color correction. For example, the saturation check and bright spot detection can be performed according to Equation (12), below.

$$R = \begin{cases} 2 & \text{if } Y_0 >= T2 \\ 1 & \text{else if } Y_0'' >= T1 \\ 0 & \text{else} \end{cases} \qquad (12)$$

In one embodiment, T1 can be set equal to 10 and T2 can be set equal to 240.

The detection module 255 can then apply filters to the chroma channels of the image to perform a grey check and perform color spot detection. This can provide information regarding possible non-color pixels in the preliminary correction ratio map. The pixel values of the preliminary correction ratio map can be updated using the analysis of the chroma channels, for example to exclude any erroneously included non-color pixels. In some embodiments, the grey check can be performed using Equation (6), above, and the color spot detection can be performed according to Equation (7), above. During or after performing the gray check and color spot detection, the detection module 255 can update the preliminary correction ratio map values R to generate a final correction ratio map.

In another embodiment of the color artifact detection process, the detection module 255 can apply two symmetric detection kernels with different scales to the brightness channel (Y) to detect bright spots/lines and high-contrast edges according to Equation 13)

$$R1_{i,j} = \begin{cases} 0 & \text{if } Y'_{i,j} < T1 \\ (Y'_{i,j} - T1)/(T2 - T1) & \text{if } T1 <= Y'_{i,j} <= T2 \\ 1 & \text{if } Y'_{i,j} > T2 \end{cases} \qquad (13)$$

where Y' is obtained by the maximum response of applying the two kernel on the brightness channel, i.e., Y'=max(Y*H1, Y*H2). This can provide an estimation of a color artifact map R1 indicating the location of color artifacts in the image. A saturation map R2 can be estimated from the brightness channel Y, $$R2_{i,j} = \begin{cases} 0 & \text{if } Y_{i,j} < T3 \\ 2 & \text{else} \end{cases} \qquad (14)$$

and a preliminary correction ratio map R12 can be obtained by combining the color artifact map R1 and saturation map R2 with some dilation according to Equation (15):

$$R12_{i,j} = \max\left(\max_{i-1 \le m \le i+1, j-1 \le n \le j+1} R1_{m,n}, \max_{i-2 \le m \le i+2, j-2 \le n \le j+2} R2_{m,n}\right) \qquad (15)$$

The preliminary correction ratio map R12 might include one or more non-color (i.e., black, white, and grayscale) pixels that, as such, do not need color correction. To reduce the computational latency of later correction, these non-color pixels can be excluded from subsequent color correction by checking their chroma channels (Cb and Cr) and by changing an entry in the correction ratio map associated with the non-color pixels to indicate that no chroma correction is needed. In this way, we can obtain the final correction ratio map R according to Equation (16):

$$R_{i,j} = \begin{cases} 0 & |Cr_{i,j} - 128| < T4 \,\&\&\, |Cb_{i,j} - 128| < T4 \\ R12_{i,j} & \text{else} \end{cases} \qquad (16)$$

After generating a correction ratio map, the process 600 transitions to block 615 to correct color artifacts using adaptively-selected filtering for color spot artifacts and color aberration. For example, the correction module 260 can apply directional median filtering on chroma channels with two different settings, respectively for color spots artifacts and color aberration. According to the correction ratio map generated during detection of color artifacts, the directional median filtering corrects each pixel (for example the pixel's chroma value) with different settings and different strength determined by the entry corresponding to the pixel in the correction ratio map.

In one embodiment, the correction module 260 can use directional median filtering in four directions, each of which is 5×3 median filter. Median filtering is well-suited to keep desired color features in an image while correcting color artifacts. Compared with non-directional median filtering (5×5), the 5×3 directional median filtering is better able to preserve fine color features (e.g., corners and lines) and has a reduced computational cost. In addition, the correction module 260 can control the strength of correction applied to an image or portion of an image by adjusting the direction of the 5×3 median filter.

In some embodiments, for each pixel in each chroma channel (Cb and Cr), the correction module 260 can apply a 5×3 median filter along each of four directions and obtain four median values. After sorting, the four median values as can be denoted as $C_1 < C_2 < C_3 < C_4$:

$$C_1 < C_2 < C_3 < C_4 \quad (17)$$

When the correction ratio map corresponding to a pixel is R==0, which indicates that this pixel was not detected as belonging to a color artifact, the corrected chroma value for the pixel can be set to $C_{corrected} = C_0$, where $C_0$ is the input or current chroma value of the current pixel. When the correction ratio map corresponding to the pixel falls within the range 0<R<=1, which indicates that this pixel was detected as being close to a color spot artifact such as color spots or thin lines, the correction module 260 can obtain the corrected chroma value $C_{corrected}$ for the pixel by selecting the conservative (i.e., smallest difference with the current value $C_0$) median value from $C_1$, $C_2$, $C_3$, and $C_4$ and weighting it with the current chroma value $C_0$ according to Equation (9), above, in some embodiments, or according to the following in other embodiments:

$$C_{corrected} = (1-R)*C_0 + R*\arg\min_{i=1,2,3,4} |C_i - C_0| \quad (18)$$

When the correction ratio map corresponding to the pixel is R==2, which indicates that the pixel was detected as being close to a saturated region or regions and possible color aberration, the correction module 260 can obtain the corrected chroma value $C_{corrected}$ for the pixel by selecting the aggressive (desaturated) median value according to Equation (10), above.

Since the aggressive direction for median filtering is often perpendicular to the conservative direction, the correction module 260 can first search for the conservative direction by determining which of the resulting chroma values $C_1$, $C_2$, $C_3$, and $C_4$ has the smallest difference with the current value $C_0$. The aggressive correction value either be determined by determining which of the resulting chroma values $C_1$, $C_2$, $C_3$, and $C_4$ results from the median filter in the opposite direction as the conservative direction, that is perpendicular to the conservative direction, or by determining which of the resulting chroma values $C_1$, $C_2$, $C_3$, and $C_4$ has the largest difference with the current value $C_0$.

At block 620, the verification module 265 can analyze the corrected chroma values $C_{corrected}$ to ensure that color artifacts are corrected without causing additional artifacts or de-saturation. For instance, it is possible that directional median filtering may cause some additional color artifacts such as transforming a black or white pixel into a colorful pixel due to its colorful neighborhood. To avoid introducing such additional color artifacts, the verification module 265 can perform a "clamping" operation, which limits the final output values. In some embodiments, the final output chroma value can be obtained as follows:

$$C_{final} = \begin{cases} \text{Clamp}(C_{corrected1}, 128, C_0) & \text{if } C_0 > 128 \\ \text{Clamp}(C_{corrected}, C_0, 128) & \text{else} \end{cases} \quad (19)$$

Although not illustrated, some embodiments of the process 600 can perform some interpolation between the Cb/Cr values output from the verification step and the input Cb/Cr values to obtain the final output Cb/Cr values. In this way, the process 600 can further control the color artifact correction strength by controlling the interpolation weight.

At block 625 the color artifact corrector 240 can output the corrected image data such as for storage or display.

Implementing Systems and Terminology

Implementations disclosed herein provide systems, methods and apparatus for generating a color-corrected image with an electronic device having one or more imaging sensors. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and memory including instructions or modules for carrying out the CNR process discussed above. The memory referred to herein may be one a memory component, two or more memory components, or may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. The device may also have data, one or more processors loading instructions and/or data from memory, one or more communication interfaces, one or more input devices, one or more output devices such as a display device and a power source/interface. The processor referred to herein may be a single processor component or multiple processor components unless specified, and can also be multiple processors configured onto one component. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for correcting color artifacts in an image having a plurality of pixels, the method comprising:
  receiving image data of the image, the image data including a luma (Y) component value and two chroma components values for each of the plurality of pixels in the image;
  detecting at least one color artifact in the Y component values of the image data;
  generating a correction ratio map corresponding to the plurality of pixels in the image, the correction ratio map indicating the location of the at least one color artifact in the image data;
  applying a plurality of directional median filters to each chroma component to generate a plurality of median values for a subset of the chroma component values;
  for each of the subset of chroma component values, selecting one of the plurality of median values based at least partly on a corresponding correction ratio map entry; and
  outputting a corrected chroma value for the pixel based at least partly on the selected one of the plurality of median values.

2. The method of claim 1, further comprising receiving the median values and a first correction ratio map entry at a correction module, the first correction ratio map entry corresponding to the pixel.

3. The method of claim 1, further comprising updating the correction ratio map based on analysis of at least one of Cb and Cr components of the image data, wherein updating the correction ratio map excludes a non-color pixel from subsequent chroma correction by changing a second correction ratio map entry value associated with the non-color pixel.

4. The method of claim 1, further comprising updating the correction ratio map in response to a gray check result performed on one or both chroma components.

5. The method of claim 1, wherein selecting one of the plurality of median values comprises selecting a most conservative median value if the first correction ratio map entry indicates that the pixel is associated with a color spot artifact.

6. The method of claim 5, wherein outputting the corrected chroma value further comprises weighting the most conservative median value with the input chroma value.

7. The method of claim 1, wherein selecting one of the plurality of median values comprises selecting a most aggressive median value if the first correction ratio map entry indicates that the pixel is associated with a color aberration.

8. A system for correcting for color artifacts in an image, comprising:
   a detection module configured to detect at least one color artifact in an image comprising a plurality of pixels, the detection module further configured to generate a correction ratio map having an entry for each of a plurality of pixels in the image, the entry indicating a type of color artifact associated with a corresponding pixel;
   a correction module configured calculate a corrected chroma value of the corresponding pixel based at least partly on the entry, the entry indicating a type of color artifact associated with the corresponding pixel, the correction module further configured to select one of a plurality of directional median filters based on the entry to use to calculate a corrected chroma value, the correction module further configured to select a first directional median filter if the entry indicates that the corresponding pixel is associated with a color spot artifact and to select a second directional median filter if the entry indicates that the corresponding pixel is associated with a color aberration; and
   a verification module configured to verify the corrected chroma value to reduce introduction of additional artifacts or de-saturation of legitimate color features in a corrected image formed from the corrected chroma value.

9. The system of claim 8, wherein the plurality of directional median filters comprise a vertical 5×3 median filter, a horizontal 5×3 median filter, and two diagonal 5×3 median filters, and wherein the diagonal 5×3 median filters are perpendicular to one another.

10. The system of claim 8, wherein the correction ratio map entry indicates whether the corresponding pixel is associated with no color artifact, with a color spot artifact, or with a color aberration.

11. The system of claim 8, wherein the detection module comprises a correction map circuit configured to generate preliminary correction ratio map entry values based at least partly on analysis of a luma component of the captured image.

12. The system of claim 11, wherein the correction map circuit comprises a plurality of modules for convolving the luma component with a plurality of kernels for detecting color spot artifacts.

13. The system of claim 11, wherein the correction map circuit comprises a module for building a saturation map of the luma component.

14. The system of claim 11, wherein the detection module further comprises a correction map updating circuit configured to update the preliminary correction ratio map entry values based at least partly on analysis of one or both chroma components of the captured image.

15. The system of claim 14, wherein the correction map updating circuit comprises a gray check module configured to determine whether each of the plurality of pixels is a non-color pixel.

16. The system of claim 14, wherein the correction map updating circuit comprises a plurality of modules for convolving the one or both chroma components with kernels for detecting color spot artifacts.

17. The system of claim 14, wherein the correction map updating circuit comprises a module configured to update the correction ratio map entry based at least partly on a gray check result and a color spot check result, wherein the gray check and the color spot check are performed on the one or both chroma components.

18. The system of claim 8, wherein the correction module includes a plurality of filter modules for applying the plurality of directional median filters to an input chroma value of the corresponding pixel to generate a plurality of median values.

19. The system of claim 18, the correction module further comprising an adaptive selection module configured to receive the correction ratio map entry and the plurality of median values and to output a corrected chroma value for the corresponding pixel.

20. The system of claim 8, further comprising:
   memory configured to store the image; and
   a processor coupled to the memory, the processor configured to retrieve the image and process the image using the detection module, the correction module, and the verification module.

21. A method for generating a correction ratio map for correcting color artifacts in an image, the method comprising:
   receiving image data comprising the image, the image comprising a luma component and two chroma components;
   convolving the luma component with at least one symmetric kernel to generate a color artifact map;
   generating a preliminary correction ratio map based at least partly on the color artifact map, wherein the preliminary correction ratio map contains an entry corresponding to each of a plurality of pixels of the image;
   performing a gray check on at least one of the chroma components; and
   updating the preliminary correction ratio map based at least partly on the gray check to exclude any non-color pixels from subsequent color correction, thereby generating a final correction ratio map.

22. The method of claim 21, further comprising generating an estimated saturation map based on the luma component, and wherein generating the preliminary correction ratio map is further based at least partly on the estimated saturation map.

23. The method of claim 21, wherein performing the gray check comprises convolving at least one of the chroma components with a saturation detection kernel.

24. The method of claim 21, wherein convolving the luma component with at least one symmetric kernel further comprises downsampling the luma component.

25. The method of claim 21, further comprising:
performing a color spot check on at least one of the chroma components; and
updating the preliminary correction ratio map based at least partly on the color spot check.

26. A non-transitory computer-readable medium storing instructions which, when executed, cause at least one processor to perform a method comprising:
receiving image data of an image, the image data including a luma (Y) component value and two chroma components values for each of the plurality of pixels in the image;
detecting at least one color artifact based on both luma and chroma component values of the image data;
generating a correction ratio map corresponding to the plurality of pixels in the image, the correction ratio map indicating the location of the at least one color artifact in the image data;
applying a plurality of directional median filters to each chroma component to generate a plurality of median values for a subset of the chroma component values;
for each of the subset of chroma component values, selecting one of the plurality of median values based at least partly on a corresponding correction ratio map entry; and
outputting a corrected chroma value for the pixel based at least partly on the selected one of the plurality of median values.

27. The non-transitory computer-readable medium of claim 26, the method further comprising further comprising updating the correction ratio map in response to a gray check result performed on one or both chroma components.

28. The non-transitory computer-readable medium of claim 26, the method further comprising further comprising updating the correction ratio map in response to a color spot check result performed on one or both chroma components.

29. The non-transitory computer-readable medium of claim 26, wherein selecting one of the plurality of median values comprises selecting a most conservative median value if the first correction ratio map entry indicates that the pixel is associated with a color spot artifact.

30. The non-transitory computer-readable medium of claim 26, wherein selecting one of the plurality of median values comprises selecting a most aggressive median value if the first correction ratio map entry indicates that the pixel is associated with a color aberration.

* * * * *